US009174885B2

(12) United States Patent
Taulbee

(10) Patent No.: US 9,174,885 B2
(45) Date of Patent: Nov. 3, 2015

(54) NITROGEN FERTILIZER COMPOSITION AND METHOD TO IMPROVE DETECTION AND LESSEN THE EXPLOSIVE POTENTIAL OF NITROGEN-BASED FERTILIZERS

(71) Applicant: University of Kentucky Research Foundation, Lexington, KY (US)

(72) Inventor: Darrell Taulbee, Frankfort, KY (US)

(73) Assignee: UNIVERSITY OF KENTUCKY RESEARCH FOUNDATION, Lexington, KY (US)

(*) Notice: Subject to any disclaimer, the term of this patent is extended or adjusted under 35 U.S.C. 154(b) by 0 days.

(21) Appl. No.: 14/202,092

(22) Filed: Mar. 10, 2014

(65) Prior Publication Data
US 2014/0260470 A1    Sep. 18, 2014

Related U.S. Application Data

(60) Provisional application No. 61/789,667, filed on Mar. 15, 2013.

(51) Int. Cl.
| | |
|---|---|
| C05C 9/00 | (2006.01) |
| C05G 3/00 | (2006.01) |
| C05G 1/00 | (2006.01) |
| C05C 1/02 | (2006.01) |

(52) U.S. Cl.
CPC ............... *C05G 3/0023* (2013.01); *C05C 1/02* (2013.01); *C05C 9/005* (2013.01); *C05G 1/00* (2013.01); *C05G 3/00* (2013.01); *C05G 3/0011* (2013.01); *C05G 3/0029* (2013.01); *C05G 3/0041* (2013.01)

(58) Field of Classification Search
USPC ........................ 71/28, 29, 30, 64.07
See application file for complete search history.

(56) References Cited

U.S. PATENT DOCUMENTS

| | | | | |
|---|---|---|---|---|
| 3,276,857 | A | * | 10/1966 | Sor et al. ................ 71/64.03 |
| 4,013,442 | A | | 3/1977 | Kawar |
| 4,026,695 | A | * | 5/1977 | Young ..................... 71/28 |
| 4,026,696 | A | * | 5/1977 | Young ..................... 71/28 |
| 4,028,088 | A | * | 6/1977 | Young et al. ............. 71/28 |
| 4,078,912 | A | | 3/1978 | Hawkins |
| 4,081,266 | A | | 3/1978 | MacKinnon |
| 4,082,533 | A | | 4/1978 | Wittenbrook et al. |
| 4,330,319 | A | | 5/1982 | Bexton et al. |
| 4,469,503 | A | | 9/1984 | Stockel |
| 4,500,335 | A | | 2/1985 | Fenn |
| 4,530,714 | A | | 7/1985 | Kolc et al. |
| 5,021,077 | A | * | 6/1991 | Moore ..................... 71/17 |
| 5,030,267 | A | | 7/1991 | Vlnaty et al. |
| H1085 | H | | 8/1992 | Simmons et al. |
| 5,599,374 | A | | 2/1997 | Detrick |
| 5,630,861 | A | | 5/1997 | Yaniv |
| 5,652,196 | A | | 7/1997 | Luthra et al. |

(Continued)

*Primary Examiner* — Wayne Langel
(74) *Attorney, Agent, or Firm* — King & Schickli, PLLC

(57) ABSTRACT

A nitrogen fertilizer composition includes urea and a nitrate-based fertilizer such as ammonium nitrate, calcium ammonium nitrate and mixtures of ammonium nitrate and calcium ammonium in which the urea and total nitrogen are at concentrations of 20 percent by weight or greater and the concentration of ammonium nitrate is at 30 percent or greater by weight. One or both of the urea and nitrate-based fertilizer are coated with an agriculturally compatible material. The fertilizer composition provides significant nitrate nitrogen for legitimate agricultural use yet is not amenable to the production of an explosive by crushing or by aqueous extraction. A pleasant smelling odorant is added to the composition to facilitate detection.

4 Claims, 4 Drawing Sheets

(56) References Cited

U.S. PATENT DOCUMENTS

| | | |
|---|---|---|
| 5,698,003 A | 12/1997 | Omilinsky et al. |
| 6,179,893 B1 | 1/2001 | Bendix et al. |
| 6,565,860 B1 | 5/2003 | Walker |
| 6,749,659 B1 | 6/2004 | Yu et al. |
| 6,830,603 B2 | 12/2004 | Whitehurst et al. |
| 7,416,785 B2 * | 8/2008 | Mente ............ 428/407 |
| 7,494,525 B2 | 2/2009 | Hojjatie et al. |
| 7,662,205 B2 | 2/2010 | Burnham |
| 7,785,553 B2 | 8/2010 | Taulbee |
| 7,998,235 B2 | 8/2011 | Kohnke et al. |
| 8,110,018 B2 * | 2/2012 | Lylykangas et al. ....... 71/61 |
| 8,133,294 B2 | 3/2012 | Whitehurst et al. |
| 8,137,431 B2 | 3/2012 | Hero et al. |
| 8,163,058 B2 | 4/2012 | Whitehurst et al. |
| 8,236,086 B2 * | 8/2012 | Janssen et al. ....... 71/64.07 |
| 8,354,043 B2 * | 1/2013 | Flynn et al. ............ 252/372 |
| 8,491,692 B2 | 7/2013 | Anderson et al. |
| 2004/0163434 A1 | 8/2004 | Quin |
| 2007/0095118 A1 | 5/2007 | Evers et al. |
| 2007/0166341 A1 | 7/2007 | Nakatsu et al. |
| 2010/0326152 A1 * | 12/2010 | Mente ................ 71/27 |
| 2012/0067093 A1 * | 3/2012 | Kweeder ............ 71/27 |
| 2013/0019813 A1 * | 1/2013 | Rubin et al. ......... 119/712 |
| 2013/0305795 A1 * | 11/2013 | Pursell et al. .......... 71/23 |
| 2014/0011678 A1 * | 1/2014 | Loughner et al. ...... 504/136 |

* cited by examiner

NITROGEN FERTILIZER COMPOSITION AND METHOD TO IMPROVE DETECTION AND LESSEN THE EXPLOSIVE POTENTIAL OF NITROGEN-BASED FERTILIZERS

This utility patent application claims the benefit of priority in U.S. Provisional Patent Application Ser. No. 61/789,667 filed on Mar. 15, 2013, the entirety of the disclosure of which is incorporated herein by reference.

TECHNICAL FIELD

This document relates generally to the fertilizer field and, more particularly, to nitrate based fertilizer compositions that may be more easily detected and that lessen the explosive potential of nitrate-based fertilizers.

BACKGROUND

The destructive power of ammonium nitrate (AN) has been graphically demonstrated in a number of malicious attacks including the more widely known instances of the Alfred P. Murrah Federal building in Oklahoma City and the J.W. Marriott Hotel in Jakarta. AN mixed with fuel oil or with a catalyst such as aluminum powder creates a powerful explosive, which is often a weapon of choice for acts of terrorism. Despite its critical role in agriculture, AN has become a vehicle for spreading chaos and an ominous threat to modern society.

According to data published by the Joint Improvised Explosive Device Defeat Organization (JIEDDO), over 80% of the improvised explosive devices (IEDs) and home-made explosives (HMEs) deployed in Afghanistan in 2011 use AN as the explosive precursor. The manufacture of AN is prohibited in Afghanistan but is marketed in neighboring Pakistan as calcium ammonium nitrate (CAN), a mixture of water soluble AN and insoluble calcite (limestone) or dolomite. As marketed, CAN is typically a 4 to 1 prilled or granulated blend of ammonium nitrate and calcite or dolomite. CAN is somewhat less sensitive to detonation than pure AN but can be converted to an explosive with minimum effort. The two most common approaches for converting CAN into a bomb precursor is to simply crush it to increase its surface area/reactivity or to extract it with water followed by evaporative re-concentration of the ammonium nitrate. These two routes for making HME's require minimal sophistication and rely on readily available materials/equipment; i.e., sausage mills, diesel, aluminum, powdered sugar, etc. Furthermore, in addition to being readily converted into an explosive, CAN is easily hidden in any variety of packaging configurations and is essentially non-detectable by stand-off equipment or canines. The proposed fertilizer reformulation set forth in this document prevents the crushing or extraction of CAN to make an IED/HME while simultaneously using odorants to render it detectable by smell without the need for sophisticated detection equipment.

Urea is a commonly used alternate source of nitrogen in agriculture. However, CAN or AN is generally preferred due to improved and prolonged response of many field crops to nitrate nitrogen. Further, depending on soil moisture, temperature, and bacterial activity, urea is prone to volatile losses of nitrogen as ammonia gas making the timing of field application of urea more critical than for CAN.

Commercial-grade urea contains about 44% available nitrogen versus about 27 wt % nitrogen in CAN meaning that combining urea and CAN yields a product with a total nitrogen content greater than that of CAN. However, combining urea with CAN yields a highly hygroscopic mix that immediately begins to absorb atmospheric moisture, even in semi-arid conditions (i.e., the combination has a low critical relative humidity).

Absorption of water by the mixture of urea and AN or urea and CAN may be avoided by applying a thick coating to the urea or to the AN or CAN granules to prevent contact between the urea and the ammonium nitrate components: An attempt to increase detonability by crushing eliminates this barrier allowing the AN/urea or CAN/urea to interact and convert to a non-detonable slurry. Likewise, unlike the water-insoluble limestone component of CAN, the AN cannot be purified by aqueous extraction since both urea and AN are water soluble.

The platform for the detection and defeat of IED/HMEs set forth in this document entails coating urea and/or the nitrate fertilizer with gypsum or other agriculturally-compatible material and then blending the urea based and the nitrate based fertilizers into a single, high-nitrogen fertilizer. An odorant(s) with a low odor threshold is also added during or after coating to make it possible to detect the fertilizer by smell. Pleasant-smelling and non-toxic ester-based or similar odorants can be detected by humans in the parts per billion range and it is likely that military and police canines can be trained to detect such additives at even lower concentrations. Importantly, addition of a low-odor-threshold odorant facilitates detection without the need for sophisticated or cumbersome equipment.

SUMMARY

A nitrogen-based fertilizer composition comprises a first component mixed with a second component wherein the first component includes urea, which is present at a minimum concentration of 20 percent by weight and the second component comprises a nitrate-based fertilizer, in which ammonium nitrate is present at a minimum concentration of 30 percent by weight and wherein either or both the urea and nitrate-based components are coated with an agriculturally-compatible material to prevent direct contact. In one possible embodiment the nitrate-based fertilizer is a material selected from a group consisting of ammonium nitrate, calcium ammonium nitrate and mixtures thereof. The agriculturally compatible material may be selected from a group consisting of gypsum, calcium sulfate hemi-hydrate, calcium carbonate, calcium nitrate, soda lime, potassium sulfate, magnesium sulfate, bentonite, silica gel, potassium phosphate, potassium nitrate, potassium chloride, sodium sulfate, ammonium sulfate, sodium silicate, dolomite, anhydrite, sulfur, polyurethane, isobutylidine diurea, ureaform, methylene ureas, urea-formaldehyde polymers, and other commercially available coating polymers and mixtures thereof. Further the composition may also include an agriculturally-compatible odorant. Agriculturally-compatible odorants include but are not necessarily limited to menthol, methylbutylacetate, D-limonene, ethyl vanillin, ethylmethylbutyrate, L-carvone, ethyl cinnamate, methyl salicylate, esters, methyl esters, ethyl esters, acetates, methyl acetates, ethyl acetates, cyclic terpenes, isoamylacetate, octyl acetate, terpenoids, and mixtures thereof.

In accordance with an additional aspect a method is provided for improving detection and lessening explosion potential of a nitrate-based fertilizer. That method may be broadly describes as including the mixing of urea with a nitrate-based fertilizer in which the urea and/or nitrate-based fertilizer are coated with an agriculturally-compatible material and in which the ammonium nitrate component of the nitrate-based fertilizer component is present at minimum concentration of 30 percent by weight. The method may further include the additional steps of coating the urea with the agriculturally-compatible material. Further the method may also include coating the nitrate-based fertilizer with the agriculturally compatible material. Further the method may include adding an agriculturally-compatible odorant.

In accordance with still another aspect, a method is provided for improving the detection and lessening the explosion potential of a nitrate-containing fertilizer. That method includes mixing urea with pure calcium ammonium nitrate, one or both of which is coated with an agriculturally compatible material, and adding an odorant to enhance detection. Further, the method may include providing the urea and the ammonium nitrate component of the calcium ammonium nitrate at a minimum concentration of 20 and 30 percent by weight, respectively, and a minimum total nitrogen content of 20 percent by weight.

In accordance with yet another aspect, a method is provided for improving detection and lessening the explosion potential of a nitrate-containing fertilizer wherein that method comprises the steps of mixing urea with ammonium nitrate, one or both of which are coated with an agriculturally compatible material, and adding an odorant to enhance detection. That method may further include providing the urea and the ammonium nitrate at minimum concentrations of 20 and 30 percent by weight, respectively. Still further the method may include adding the odorant at a maximum concentration of 0.1 percent by weight.

These and other embodiments of the composition and method will be set forth in the description which follows, and in part will become apparent to those of ordinary skill in the art by reference to the following description and drawing figures.

BRIEF DESCRIPTION OF THE DRAWINGS

The accompanying drawings incorporated herein and forming a part of the specification, illustrate several aspects of the current composition and method and together with the description serve to explain certain principles thereof. In the drawings.

DETAILED DESCRIPTION

Figure 1:
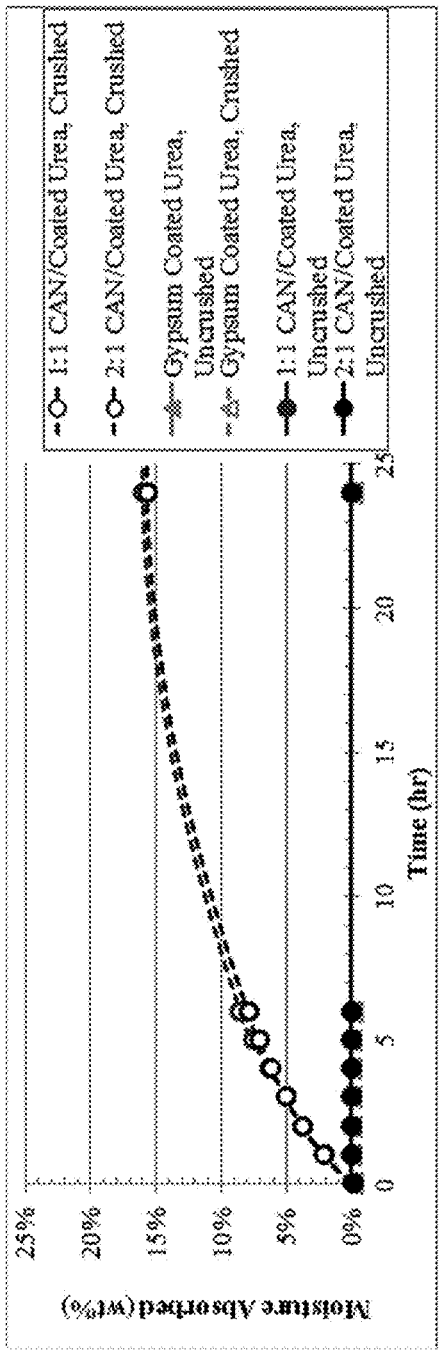
FIG. 1 is a graph illustrating moisture absorption by crushed and uncrushed samples maintained at 15° C. and 50% relative humidity. Note that only the crushed mixtures of calcium ammonium nitrate and coated urea gained a significant amount of weight from moisture absorption whereas mixtures that were otherwise identical but they were not crushed did not pick up a significant amount of moisture.

A nitrogen-based fertilizer composition includes a first component mixed with a second component with one or both components coated with an agriculturally-compatible material to prevent direct contact between the two components. The first component includes urea. In one embodiment the first component is urea. The second component comprises a nitrate-based fertilizer. In one possible embodiment the nitrate-based fertilizer is ammonium nitrate. In another possible embodiment the nitrate-based fertilizer is calcium ammonium nitrate. In still another possible embodiment the nitrate-based fertilizer is a mixture of ammonium nitrate and calcium ammonium nitrate. In still another possible embodiment, the minimum concentration of the first component in the composition is 20 percent by weight and the minimum concentration of the ammonium nitrate from the second component in the composition is 30 percent by weight. In no event would the concentration of the ammonium nitrate exceed 65 percent by weight.

The agriculturally-compatible material used to coat the urea and/or the nitrate-based fertilizer is nontoxic and should not interfere with the legitimate use of the fertilizer. The agriculturally compatible material may include, but is not necessarily limited to, gypsum, calcium sulfate hemi-hydrate, calcium carbonate, calcium nitrate, soda lime, potassium sulfate, magnesium sulfate, bentonite, silica gel, potassium phosphate, potassium nitrate, potassium chloride, sodium sulfate, ammonium sulfate, sodium silicate, dolomite, anhydrite, sulfur, polyurethane iso-butylidine diurea, ureaform, methylene ureas, urea-formaldehyde polymers, and other commercially available coating polymers and mixtures thereof. A number of these are extensively used or known to be beneficial to agriculture. For example over 300,000 tons of gypsum is used each year in the U.S. as a soil ameliorate and a crop nutrient. Preferably the coating is between 0.25 and 25% by weight dependent on the coating being applied and its effectiveness in preventing contact between the urea and nitrate components. The coating may be made by known application methods such as applying a binder to the surface of the urea or nitrate-based fertilizer followed by rolling with a powdered coating material (e.g., gypsum, calcium sulfate hemi-hydrate, calcium carbonate, potassium phosphate, potassium nitrate, potassium chloride, sodium sulfate, ammonium sulfate, etc.). Alternatively, the coating may be applied in liquid form (e.g. molten sulfur, sodium silicate, liquid or a two-part polymer), by spraying onto the surface of the urea or nitrate-based fertilizer as the latter is rolled, tumbled, or dropped In order to deter or prevent the use of ammonium nitrate or calcium ammonium nitrate for IED fabrication, a coating of gypsum or other agriculturally compatible material serves as both a diluent and as a barrier to prevent direct contact between the urea and the calcium ammonium nitrate or ammonium nitrate. The urea also serves a number of purposes including diluting the ammonium nitrate component to prevent crushing and detonation, maintaining a minimum total nitrogen concentration of 20 percent by weight, and reducing the critical relative humidity from 59% for pure ammonium nitrate to 18% for a crushed mixture of urea and ammonium nitrate. The critical relative humidity (CRH) is defined as the relative humidity at which a material begins to absorb moisture from the atmosphere and below which it will not absorb atmospheric moisture. It should be noted that although calcium ammonium nitrate or ammonium nitrate is diluted with both gypsum and urea, the final fertilizer blend may still retain a minimum of 27% nitrogen by weight which may have an added advantage in that the purity information that now appears on calcium ammonium nitrate packaging in volatile regions of the world could remain unchanged at 27% nitrogen.

The nitrogen-based fertilizer formulation further includes an agriculturally-compatible odorant. Such a nontoxic, agricultural-compatible odorant may include but it not necessarily limited to menthol, methylbutylacetate, D-limonene, ethyl vanillin, ethylmethylbutyrate, L-carvone, ethyl cininamate, methyl salicylate, esters, methyl esters, ethyl esters, acetates, methyl acetates, ethyl acetates, cyclic terpenes, isoamylacetate, octyl acetate, terpenoids, and mixtures thereof.

In one useful embodiment the composition consists of between 20 and 50 weight percent urea, 30 and 60 weight percent ammonium nitrate from the nitrate based fertilizer, 0.5 and 30 weight percent agriculturally-compatible material for coating the urea and/or nitrate-based fertilizer and 0.0001 and 0.25 weight percent odorant. In one possible embodiment the odorant is provided at a maximum concentration of 0.1% by weight.

As should be appreciated, a method of improving the detection and lessening the explosion potential of a nitrogen fertilizer that contains a high proportion of ammonium nitrate comprises the mixing of urea, with a nitrate-based fertilizer. The method further includes coating the urea and/or the nitrate-based fertilizer with the agriculturally-compatible material. Further the method includes using a coating material selected from a group consisting of gypsum, calcium sulfate hemi-hydrate, calcium carbonate, calcium nitrate, soda lime, potassium sulfate, magnesium sulfate, bentonite, silica gel, potassium phosphate, potassium nitrate, potassium chloride, sodium sulfate, ammonium sulfate, sodium silicate, dolomite, anhydrite, sulfur, polyurethane, isobutylidine diurea, ureaform, methylene ureas, urea-formaldehyde polymers, and other commercially available coating polymers and mixtures thereof. And in yet another embodiment the method may include adding an agriculturally-compatible odorant including, for example, an odorant selected from a group consisting of menthol, methylbutylacetate, D-limonene, ethyl vanillin, ethylmethylbutyrate, L-carvone, ethyl cininamate, methyl salicylate, esters, methyl esters, ethyl esters, acetates, methyl acetates, ethyl acetates, cyclic terpenes, isoamylacetate, octyl acetate, terpenoids, and mixtures thereof.

In accordance with yet another aspect, a method is provided for improving the detection and lessening the explosive potential of a nitrate-containing fertilizer which comprises the steps of mixing urea with calcium ammonium nitrate, with the urea or calcium ammonium nitrate, coated with an agriculturally compatible material, and adding an odorant to enhance detection. This method includes providing the urea and the ammonium nitrate component of the calcium ammonium nitrate at minimum concentrations of 20 and 30% by weight, respectively.

Still further, a method is provided for improving the detection and lessening the explosion potential of a nitrate containing fertilizer which comprises mixing urea with ammonium nitrate, with the urea and/or ammonium nitrate coated with an agriculturally-compatible material, and adding an odorant to enhance detection. This method includes providing the urea and the ammonium nitrate at minimum concentrations of 20 and 30% by weight, respectively. Further the method includes adding the odorant at maximum concentration of 0.1% by weight.

Advantageously, the coating of the urea and/or the nitrate-based fertilizer prevents direct contact between the urea and the calcium ammonium nitrate and/or ammonium nitrate thereby providing a stable mixture for legitimate use as a fertilizer. At the same time such a fertilizer composition cannot be crushed to make an IED or HME. This is because the ammonium nitrate concentration is too low in the crushed fertilizer to support detonation. Further once crushed, the ammonium nitrate and urea combine to absorb atmospheric moisture due to their low CRH. Further, unlike calcium ammonium nitrate, the reformulated fertilizer composition cannot be extracted and dried to recover ammonium nitrate in sufficient purity to detonate. This is because both the urea and the ammonium nitrate component of the calcium ammonium nitrate are water soluble which prevents the AN from being separated and concentrated by extraction and drying. For example extraction/drawing of a 50:50 blend of calcium ammonium nitrate and urea coated with 20 weight percent gypsum results in a maximum ammonium nitrate concentration after drying of approximately 40%, which is too low to support detonation.

In addition, it should be appreciated that the odorant utilized may provide a pleasant and distinctive smell that is acceptable to farmers and may even enhance the sale appeal of the product. The odorants are natural, nontoxic and non-harmful to agriculture. Further they are stable in the presence of ammonium nitrate, calcium ammonium nitrate and urea. They also provide a readily identifiable scent which will allow government officials and trained canines to readily detect the presence of the nitrate-based fertilizer composition describe in this document.

The following examples help to further illustrate the nitrate-based fertilizer compositions as well as their benefits and advantages.

Example 1

The fertilizer coatings may be applied in batch mode by loading a targeted weight of urea prills or granules to a drum roller, roller mill, or other rolling-cylinder configuration, sprayed with between 1.0 and 1.75 percent water by weight, and rolled for about one minute to permit the urea surface to soften. Powdered calcium sulfate dihydrate (gypsum) is then added to the drum roller to provide a final ammonium sulfate to urea ratio of 1 to 3 (i.e., 25 percent ammonium sulfate by dry weight). Rolling of the urea and gypsum is continued for 2 minutes at which time, a polyurethane coating is applied at between 0.1 and 0.5 percent by weight by spraying with separate streams of isocyanate and polyol to improve the coating integrity.

Example 2

Urea is coated in batch mode by metering urea prills/granules to a roller mill and spraying with between 1.0 and 1.75 percent by weight of water and rolled for between 30 seconds and one minute to allow the urea surface to soften. Powdered ammonium sulfate, with an average diameter preferably between 5 and 50 microns, is then metered into the roller mill to provide a final ammonium sulfate to urea ratio of 1 to 6 (i.e., ~14 percent by weight ammonium sulfate). Rolling of the urea and ammonium sulfate is continued for 2 minutes at which time, limonene-D odorant may be sprayed onto the coated fertilizer prills/granules to provide an odorant concentration of 100 ppm (0.01 wt %) and rolling continued for one minute after which the coating process is complete. Alternatively, the odorant may be added subsequent to the coating step by spraying the odorant onto the coated urea as the coated urea is dropped in a dispersed stream into a receiving vessel or onto a conveyor belt. In both instances, the odorant may be diluted in ethanol or other suitable solvent to facilitate more accurate spraying at low concentration.

The fertilizer coating integrity may be improved with addition of a secondary binder additive, such as sodium silicate, co-added with a proportionately lesser amount of water binder. This places the secondary binder additive at the fertilizer/coating interface where it can improve the bond between the fertilizer prill or granule and the layer of coating material.

Example 3

CAN may coated in a continuous mode by metering CAN prills/granules to the first stage of a two-stage roller mill and spraying with 1.0 to 1.75 percent by weight water as the roller mill turns. The wetted CAN prills/granules exit the first stage by spilling over a retention dam into the second stage of the roller mill where powdered potassium sulfate is continuously metered to the roller mill to provide a potassium sulfate to CAN ratio of 1 to 9 (i.e., 10% potassium sulfate by dry weight). The coated fertilizer particles progress through the second stage as the mill continues to roll. Prior to exiting the roller mill, the coated fertilizer prills/granules may be sprayed with ethyl 2-methyl butyrate at a rate to provide an odorant concentration of 50 part per million (0.005 wt %). The odorant may be diluted in ethanol or other suitable solvent to facilitate spraying accuracy.

Coating integrity may be improved by adding between 0.5 and 1.5 percent by weight of a secondary bentonite binder co-added with the potassium sulfate to improve the durability of the coating layer.

Example 4

AN was coated in continuous mode by metering ammonium nitrate prills/granules to the first stage of a two-stage roller mill and spraying with 1.0 to 1.75 percent by weight water as the roller mill turns. The wetted AN prills/granules exit the first stage by spilling over a retention dam into the second stage of the roller mill where powdered gypsum, preferably between 10 and 50 micron average particle diameter, is continuously metered to provide a final gypsum to AN ratio of 1 to 4 (i.e., 20 percent gypsum by dry weight). The coated fertilizer particles continue rolling as they progress through the second stage. Prior to the roller exit, the coated fertilizer prills/granules may be sprayed with ethyl acetate to provide an odorant concentration of 20 part per million (0.002 wt %). The odorant may be diluted in ethanol or other suitable solvent to facilitate spraying accuracy.

Example 5

A polyurethane polymer coating is applied to the urea at between 0.1 and 0.5 percent by weight to serve as a barrier to prevent direct contact between the urea and ammonium nitrate fertilizer components. Using common commercial techniques, urea is sprayed with a separate stream of isocyanate and polyol as the urea is rolled or tumbled to provide more uniform surface coverage.

Example 6

A high nitrogen content fertilizer that contains a significant concentration of ammonium nitrate but is less amenable to bomb production and more easily detected without the need for sophisticated equipment is formulated by combining a gypsum-coated urea product as described in Example 1 with commercially available CAN. These two nitrogen fertilizers are blended at a one to one ratio by metering to a roller drum or similar mixing apparatus (ribbon blender, paddle mixer) or as they are dropped to a receiving vessel or conveyor. During the blending step, the fertilizer particles are sprayed with methyl salicylate odorant at a rate which provides an odorant concentration of 20 ppm (0.002 wt %). The final formulation is a stable fertilizer that contains approximately 30 percent total nitrogen and approximately 40 percent ammonium nitrate by weight. This concentration of ammonium nitrate is too low to be used directly as an explosive by simple grinding. Further, the ammonium nitrate cannot be extracted with water and subsequently concentrated sufficiently to produce a bomb due to the presence of water-soluble urea in the fertilizer mix, which would be co-extracted with the ammonium nitrate. The formulation also contains just over 2 percent sulfur by weight, which is also a valuable nutrient for certain agronomic applications.

Example 7

A high nitrogen content fertilizer that contains a significant concentration of ammonium nitrate but is less amenable to bomb production and more easily detected without the need for sophisticated equipment is formulated by combining a potassium sulfate-coated urea product as described in example 2 with commercially available CAN. These two nitrogen fertilizers are blended at a ratio of one part of the coated urea to two parts CAN by metering to a roller drum or other suitable mixing apparatus (e.g., ribbon blender, paddle mixer) or as they are simultaneously dropped to a receiving vessel or conveyor. The final formulation is a stable fertilizer that contains approximately 31 percent total nitrogen and approximately 53 percent ammonium nitrate by weight. This concentration of ammonium nitrate is too low to be used directly as an explosive by simple grinding. Further, the ammonium nitrate cannot be readily extracted with water and subsequently concentrated sufficiently to produce a bomb due to the presence of water-soluble urea and ammonium sulfate in the fertilizer mix, which would be co-extracted with the ammonium nitrate. In addition, the formulation also contains approximately 1.5 percent potassium by weight, one of the three most critical nutrients in agriculture, over one percent sulfur by weight, a valuable nutrient for certain applications, and approximately 33 ppm (0.0033 wt %) limonene-D, an easily detected and relatively inexpensive odorant.

Example 8

A high nitrogen content fertilizer that contains a significant concentration of ammonium nitrate but is less amenable to bomb production and more easily detected without the need for sophisticated equipment is formulated by combining the coated fertilizer products described in Examples 1 and 3. These two nitrogen fertilizers are blended at a ratio of one part gypsum-coated urea from Example 1 to two parts potassium sulfate-coated CAN from Example 3 by metering both to a roller drum or similar mixing apparatus (ribbon blender, paddle mixer) or as they are simultaneously dropped to a receiving vessel or conveyor. The final formulation is a stable fertilizer that contains approximately 27 percent total nitrogen and approximately 48 percent ammonium nitrate by weight. This concentration of ammonium nitrate is too low to be used directly as an explosive by simple grinding. Further, the ammonium nitrate cannot be readily extracted with water and subsequently concentrated sufficiently to produce a bomb due to the presence of water-soluble urea and potassium sulfate in the fertilizer mix, which would be co-extracted with the ammonium nitrate. The formulation also contains just under three percent sulfur by weight, a valuable nutrient for certain agricultural applications, and approximately 33 ppm (0.0033 wt %) ethyl 2-methyl butyrate, an easily detected and reasonably inexpensive odorant. Finally, the total nitrogen content of the formulation could potentially permit the packages to be accurately labelled as 27% N. This is the same total nitrogen as marketed in CAN fertilizer.

Example 9

A high nitrogen content fertilizer that contains a significant concentration of ammonium nitrate but is less amenable to bomb production and more easily detected without the need for sophisticated equipment is formulated by combining the coated fertilizer products as described in Examples 2 and 4. These two nitrogen fertilizers are blended at a ratio of three parts ammonium sulfate-coated urea as described in Example 2 to seven parts gypsum-coated AN as described in Example 4 by metering both to a roller drum or similar mixing apparatus (ribbon blender, paddle mixer) or as they are simultaneously dropped to a receiving vessel or conveyor. The final formulation is a stable fertilizer that contains approximately 31 percent total nitrogen and approximately 56 percent ammonium nitrate by weight. This concentration of ammonium nitrate is too low to be used directly as an explosive by simple grinding. Further, it cannot be readily extracted with water and subsequently concentrated sufficiently to produce a bomb due to the presence of water-soluble urea and ammonium sulfate in the fertilizer mix, which would be co-extracted with the ammonium nitrate. The formulation also contains approximately 1.3 percent potassium by weight, one of the three most critical nutrients in agriculture, nearly four percent sulfur by weight, a valuable nutrient for certain field crops, and approximately 30 ppm (0.003 wt %) limonene-D and 15 ppm (0.0015 wt %) ethyl acetate to facilitate detection.

Example 10

A nitrogen fertilizer that contains a significant concentration of ammonium nitrate but is less amenable to bomb production and more easily detected without the need for sophisticated equipment is formulated by combining a commercially available polymer-coated urea product as described in Example 5, a commercially available CAN fertilizer, and an inexpensive, agriculturally compatible or beneficial granular solid such as limestone. The two nitrogen fertilizers and limestone are blended at a ratio of one part polymer coated urea as described in Example 5, one part limestone, and two parts CAN by metering both to a roller drum or similar mixing apparatus (ribbon blender, paddle mixer) or as they are simultaneously dropped to a receiving vessel or conveyor. During the blending step, the fertilizer particles are sprayed with methyl salicylate odorant at a rate to provide an odorant concentration of 20 ppm (0.002 wt %). The final formulation is a stable fertilizer that contains approximately 24.5 percent total nitrogen, approximately 40 percent ammonium nitrate by weight, and a sufficient odorant concentration to render the blend detectable by humans or canines. This concentration of ammonium nitrate is too low to be used directly as an explosive by grinding. Further, it cannot be sufficiently concentrated by extraction with water to produce a bomb due to the presence of water-soluble urea in the fertilizer mix, which would be co-extracted with the ammonium nitrate. The formulation has the additional advantages of providing calcium carbonate, which can be beneficial when applied to acidic soils, provides calcium that is of agronomic benefit for certain crops, and lowers the cost per ton of the fertilizer due to the addition of an inexpensive limestone component. Finally, a significant advantage to this or similar formulation is that this approach allows for the formulation of a high nitrate-nitrogen fertilizer using products that are currently commercially available thereby eliminating the requirement that a production plant be constructed.

Example 11

Figure 2:
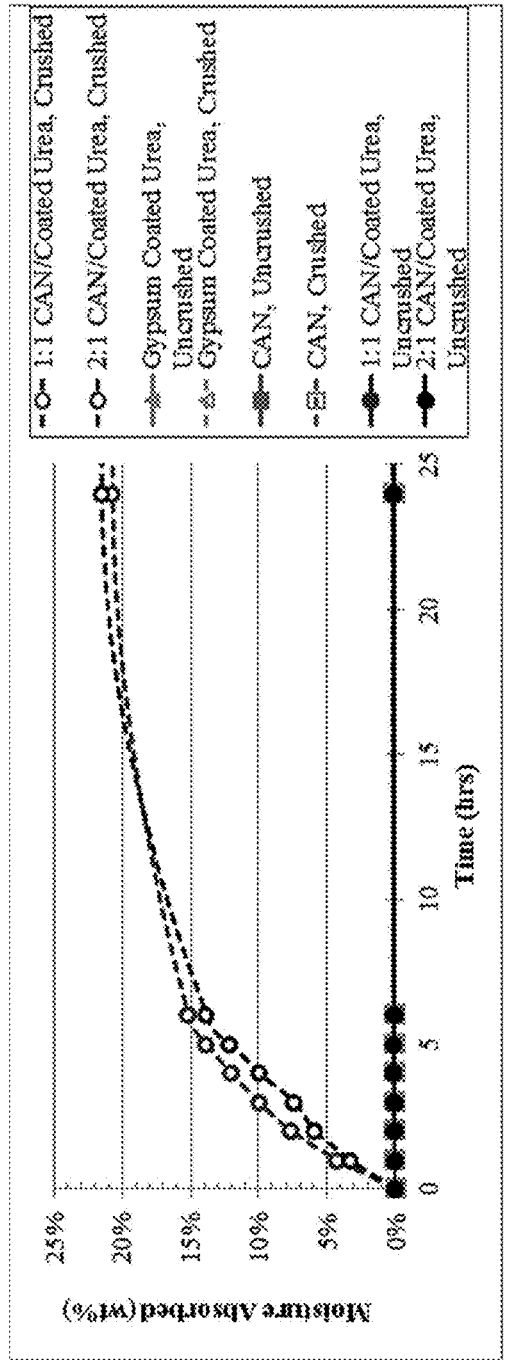
FIG. 2 is a graph illustrating moisture absorption by crushed and uncrushed samples maintained at 30° C. and 50% relative humidity. Again, note that only the crushed mixtures of calcium ammonium nitrate and coated urea gained a significant amount of weight from moisture absorption.

Several nitrogen fertilizer samples that were either crushed using a mortar and pestle or that were left intact were loaded to uncovered petri dishes, placed into a controlled-environment chamber operating at targeted conditions of temperature and relative humidity, and periodically weighed to determine the rate and extent of moisture absorption. The samples included CAN, AN, urea coated with 20 percent gypsum by weight, and one to one and two to one blends of CAN and gypsum-coated urea. Results of the CAN and gypsum coated urea samples stored at 15° C. and 50 percent relative humidity are shown in FIG. 1 while similar results are shown in FIG. 2 for samples stored at 30° C. and 50 percent relative humidity. Under both sets of conditions, the two crushed blends of CAN and gypsum-coated urea rapidly absorbed atmospheric moisture and converted to an aqueous slurry. In contrast, the extent of moisture absorption was negligible for the analogous blends that were not crushed. Further, there was no significant difference in the rate of moisture absorption for the crushed one to one versus two to one blends of CAN and coated urea. However, both the rate and extent of absorption by the crushed blends stored at 30° C. was greater than for the crushed blends that were stored at 15° C.

Figure 3:
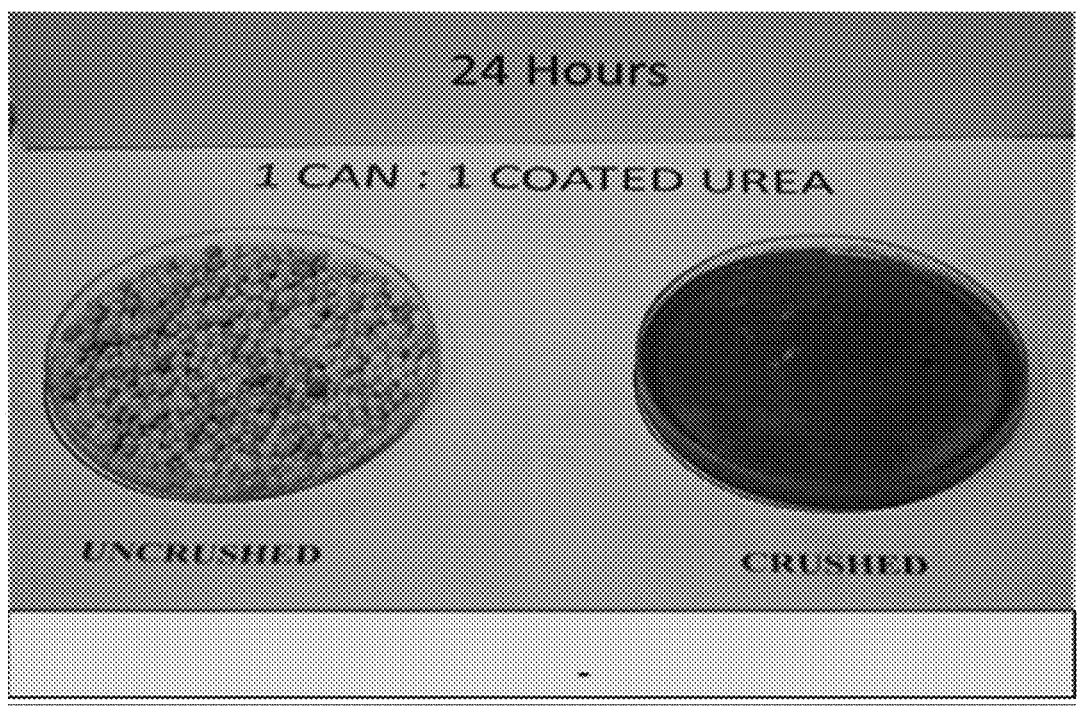
FIG. 3 is a photograph of a crushed and an uncrushed blend of CAN and gypsum-coated urea maintained at 15° C. and 50 percent relative humidity. This photograph visually demonstrates that a crushed blend of CAN and coated urea converts to an aqueous slurry after 24 hours under these conditions whereas an otherwise identical uncrushed blend remains virtually unchanged.

A photograph of crushed and uncrushed blends of CAN and gypsum-coated urea taken 24 hours after storage at 15° C. and 50 percent relative humidity is shown in FIG. 3. This photograph visually demonstrates that a crushed sample in which the AN and urea components are permitted to come into direct contact converts into an aqueous slurry within 24 hours whereas an otherwise identical blend that was not crushed and in which the AN and urea remain separate remains virtually unchanged.

Together, the results in FIG. 1 through FIG. 3 provide evidence that high concentrations of urea and a nitrate-based fertilizer can be blended into a stable formulation if one or both of the components is coated with a barrier layer to prevent the urea and AN from direct contact.

Example 12

Figure 4:
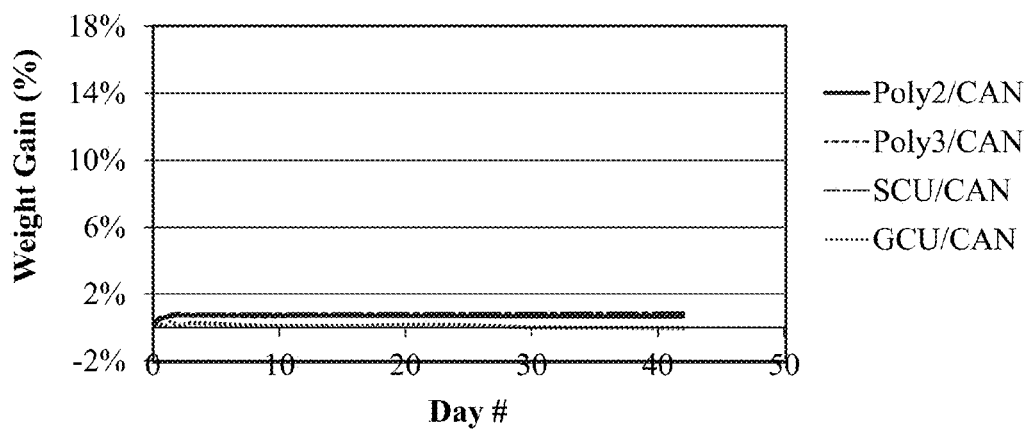
FIG. 4 is a graph illustrating long-term moisture absorption at 30° C. and 30% relative humidity by crushed and uncrushed samples of CAN mixed with polymer-coated or sulfur-coated urea. Note that the uncrushed blends shown on top exhibit long-term stability with respect to moisture absorption whereas the crushed blends do not; Poly2 and Poly3 are polymer coated urea, SCU is a sulfur-coated urea and GCU is a gypsum coated urea.
Figure 4:
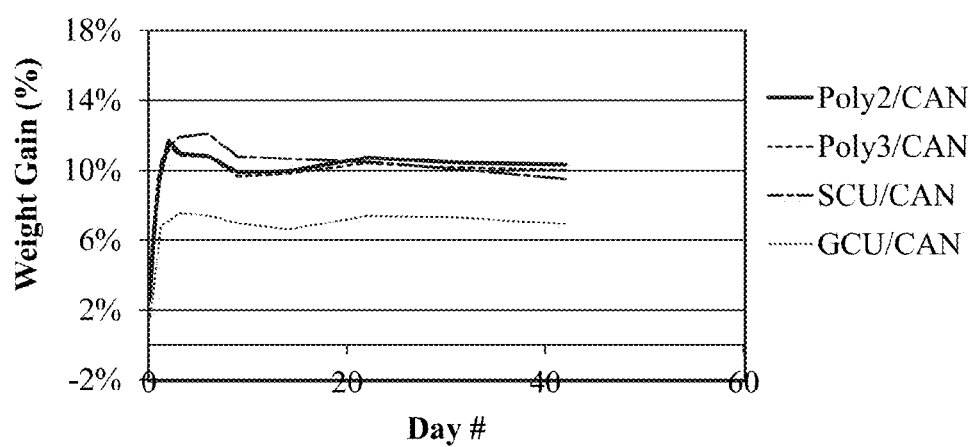

Several crushed and uncrushed 1:1 blends of coated urea and calcium ammonium nitrate (CAN) were placed into uncovered petri dishes and monitored for water absorption (weight increase) during storage at 30° C. and 30% relative humidity in a controlled-environment chamber. Five coated urea samples were evaluated including four commercial products that were coated with three polymer formulations identified as poly1, poly2, and poly3 along with a sulfur-coated-urea product (SCU). The fifth coated-urea was coated in house with 20 percent gypsum by weight. FIG. 4 shows the increase in weight over time during storage at 30° C. and 30% relative humidity. As can be seen in the top half of this figure, all of the uncrushed blends of coated urea and CAN were stable, exhibiting little or no moisture absorption, over the full 6-week storage interval. In contrast, all of the crushed blends absorbed significant water, converting to semi-liquid slurries, within the first two days of the experiment.

Figure 5:
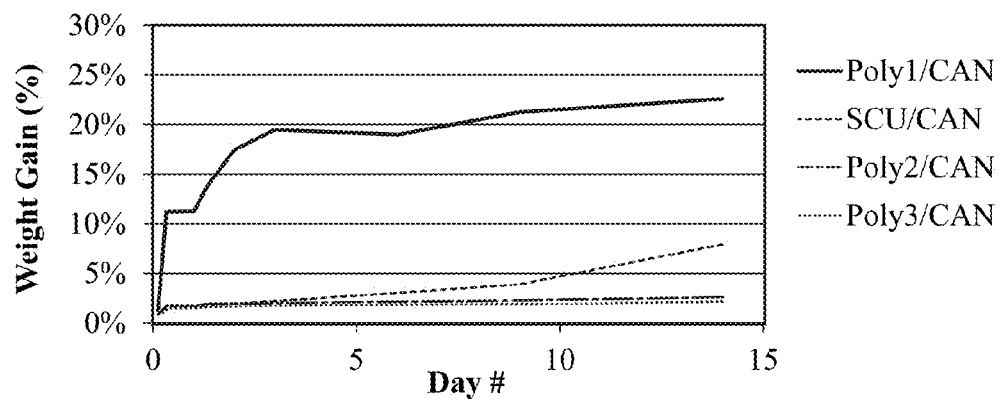
FIG. 5 is a graph illustrating long-term moisture absorption at 30° C. and 50% relative humidity by crushed and uncrushed samples of CAN mixed with polymer-coated or sulfur-coated urea. Note that most of the uncrushed blends of coated urea and CAN exhibit long-term stability with respect to moisture absorption whereas the crushed blends do not. Poly1, Poly2, and Poly3 are polymer coated urea and SCU is a sulfur-coated urea.
Figure 5:
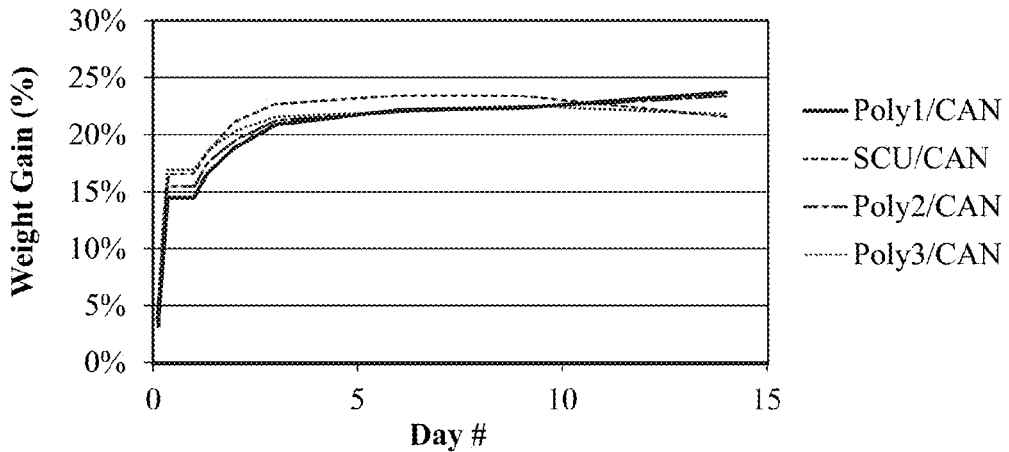

Results for a similar set of experiments in which the blends of coated urea and CAN were stored at 30° C. and 50% relative humidity are shown in FIG. 5. For these samples, the crushed blends of coated urea and CAN absorbed significant moisture within hours following crushing and storage at 50% relative humidity. In contrast, uncrushed blends of CAN and urea coated with poly2 or poly3 were stable at 50% relative humidity over the two-week test interval. However, the SCU-coated urea/CAN blend had adsorbed significant moisture by day 14 whereas the uncrushed blend of poly1/CAN adsorbed significant moisture within hours after placement in the controlled environment chamber indicating that poly1 would be an unsuitable coating for a blend of coated urea and CAN.

The results in FIGS. 4 and 5 again, suggest that it is possible to form stable high-nitrogen fertilizers by blending urea and ammonium nitrate fertilizers so long as an appropriately suitable barrier coating is used to prevent the urea and AN from direct contact. The results in FIG. 5 also demonstrate that not all urea coatings are suitable.

Example 13

Eleven 100-gram aliquots of CAN were sprayed with 11 different odorants to produce final odorant concentrations that ranged from 9 to 15 ppm and sealed into separate one-quart glass jars. A twelfth sample of CAN without an odorant was loaded to a 12th quart jar to serve as a control (blank). All 12 sealed jars were tumbled and then stored at room temperature for four days to allow the odorants to equilibrate on the surface/interior of the CAN prills before proceeding with the evaluation.

Six individuals, with no prior experience with odorant testing, were asked to randomly select, open and smell the contents of each jar and to rate the intensity of the odor on a scale of 0 to 5 with 0 being no odor and 1 to 5 corresponding to very weak, weak, moderate, strong, and very strong, respectively. They were not given information on the identity or concentration of the odorants prior to testing nor were they informed that one sample did not contain an odorant.

The individual and average results from these tests are shown in Table 1 below. The odorants are listed in the order of the most to the least intense based on the average score assigned by the six judges. Despite the relatively low concentrations of all 11 odorants, (9 to 15 ppm), the lowest average rating was 2.2 (between weak and moderate) for the carvone-d followed by the carvone-1 and ethyl vanillin. The odor intensity for four of the odorants was rated at 3.0 to 3.5 (moderate to strong) with methyl salicylate (wintergreen) rated overall as the most intense. Results from these tests demonstrate that even when the tested odorants were applied at low and relatively inexpensive concentrations, they could be easily detected by human smell without need for sophisticated detection equipment.

TABLE 1

| Odorant | Conc. (ppm) | Judge 1 Score | Judge 2 Score | Judge 3 Score | Judge 4 Score | Judge 5 Score | Judge 6 Score | Average score | Std dev |
|---|---|---|---|---|---|---|---|---|---|
| Methyl salicylate | 14 | 3 | 3 | 3 | 3 | 4 | 5 | 3.5 | 0.8 |
| Ethyl 2-methyl butyrate | 13 | 3 | 4 | 2 | 4 | 3 | 4 | 3.3 | 0.7 |
| Ethyl acetate | 9 | 2 | 4 | 4 | 2 | 3 | 4 | 3.2 | 0.9 |
| Isoamyl acetate | 15 | 2 | 3 | 4 | 4 | 3 | 3 | 3.2 | 0.7 |
| Limonene-D | 10 | 3 | 4 | 4 | 1 | 3 | 3 | 3.0 | 1.0 |
| Menthol | 11 | 2 | 3 | 3 | 3 | 3 | 3 | 2.8 | 0.4 |
| Octyl acetate | 10 | 4 | 3 | 2 | 2 | 3 | 3 | 2.8 | 0.7 |
| Ethyl cinnamate | 15 | 2 | 2 | 2 | 4 | 2 | 5 | 2.8 | 1.2 |
| Carvone-I | 11 | 3 | 3 | 1 | 2 | 4 | 2 | 2.5 | 1.0 |
| Ethyl vanillin | 12 | 3 | 3 | 1 | 2 | 3 | 3 | 2.5 | 0.8 |
| Carvone-d | 13 | 1 | 2 | 2 | 3 | 3 | 2 | 2.2 | 0.7 |
| Blank | 0 | 0 | 0 | 0 | 0 | 2 | 1 | 0.5 | 0.8 |

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A nitrogen-based fertilizer composition, comprising:
a first component mixed with a second component wherein said first component includes urea and said second component comprises a nitrate-based fertilizer, said nitrogen-based fertilizer being selected from a group consisting of ammonium nitrate, calcium ammonium nitrate and mixtures thereof;
a coating of an agriculturally-compatible material is provided on (a) said first component, (b) said second component or (c) said first and second component, said agriculturally compatible material being selected from a group consisting of gypsum, calcium sulfate hemi-hydrate, calcium carbonate, calcium nitrate, soda lime, potassium sulfate, magnesium sulfate, bentonite, silica gel, potassium phosphate, potassium nitrate, potassium chloride, sodium sulfate, ammonium sulfate, sodium silicate, dolomite, anhydrite, sulfur, polyurethane, isobutylidine diurea, ureaform, methylene ureas, urea-formaldehyde polymers, other coating polymers, and mixtures thereof; and
an odorant having a low-odor threshold, wherein said odorant is natural, nontoxic, non-harmful to agriculture and pleasant-smelling to humans, and said odorant is detectable by smell without any processing of said nitrogen-based fertilizer composition, said odorant being selected from a group of materials consisting of menthol, methylbutylacetate, D-limonene, ethyl vanillin, ethylmethylbutyrate, L-carvone, ethyl cininamate, methyl salicylate, esters, methyl esters, ethyl esters, acetates, methyl acetates, ethyl acetates, cyclic terpenes, isoamylacetate, octyl acetate, terpenoids, and mixtures thereof; and wherein said coating prevents absorption of water by said mixture and prevents direct, physical contact between the urea in said first component and the nitrate-based fertilizer in said second component.

2. A method of improving detection and lessening explosion potential of a nitrate-based fertilizer, comprising:
mixing urea, with a nitrate-based fertilizer wherein (a) the urea, (b) the nitrate-based fertilizer or (c) both the urea and the nitrate-based fertilizer are coated with an agriculturally compatible material;
adding an odorant having a low-odor threshold, wherein said odorant is natural, nontoxic, non-harmful to agriculture and pleasant-smelling to humans and said odorant is detectable by smell without any processing of said nitrogen-based fertilizer;
said odorant being selected from a group of materials consisting of menthol, methylbutylacetate, D-limonene, ethyl vanillin, ethylmethylbutyrate, L-carvone, ethyl cininamate, methyl salicylate, esters, methyl esters, ethyl esters, acetates, methyl acetates, ethyl acetates, cyclic terpenes, isoamylacetate, octyl acetate, terpenoids, and mixtures thereof; and
using as said coating a material selected from a group consisting of gypsum, calcium sulfate hemi-hydrate, calcium carbonate, calcium nitrate, soda lime, potassium sulfate, magnesium sulfate, bentonite, silica gel, potassium phosphate, potassium nitrate, potassium chloride, sodium sulfate, ammonium sulfate, sodium silicate, dolomite, anhydrite, sulfur, polyurethane, isobutylidine diurea, ureaform, methylene ureas, urea-formaldehyde polymers, other coating polymers, and mixtures thereof; and
wherein said coating prevents absorption of water by said mixture and prevents direct, physical contact between said urea and said nitrate-based fertilizer.

3. The method of claim 2, including selecting said nitrate-based fertilizer from a group consisting of ammonium nitrate, calcium ammonium nitrate and mixtures thereof.

4. A method of improving detection and lessening explosion potential of a nitrate-containing fertilizer, comprising:
mixing urea with ammonium nitrate wherein the urea and/or ammonium nitrate is coated with an agriculturally compatible material;
providing (a) the urea at a minimum concentration of 20 weight percent and (b) the ammonium nitrate at a minimum concentration of 30 weight percent and a maximum concentration of 65 weight percent;
adding an odorant having a low-odor threshold, wherein said odorant is natural, nontoxic, non-harmful to agriculture and pleasant-smelling to humans and said odorant is detectable by smell without any processing of said nitrogen-based fertilizer to enhance detection, wherein said oderant is added at a maximum concentration of 0.1 percent by weight;
selecting said odorant from a group of materials consisting of menthol, methylbutylacetate, D-limonene, ethyl vanillin, ethylmethylbutyrate, L-carvone, ethyl cininamate, methyl salicylate, esters, methylesters, ethyl esters, cyclic terpenes, isoamylacetate, octyl acetate, terpenoids, and mixtures thereof; and
wherein said coating prevents absorption of water by said mixture and prevents direct, physical contact between said urea and said ammonium nitrate.

* * * * *